United States Patent
Wu et al.

(10) Patent No.: US 8,367,996 B2
(45) Date of Patent: Feb. 5, 2013

(54) SOLAR SENSING SYSTEM AND SOLAR TRACKING METHOD THEREOF

(75) Inventors: Jiunn-Chi Wu, Taoyuan County (TW);
Pi-Cheng Tung, Taoyuan County (TW);
Yan-Bin You, Taoyuan County (TW)

(73) Assignee: National Central University, Taoyuan County (TW)

( * ) Notice: Subject to any disclaimer, the term of this patent is extended or adjusted under 35 U.S.C. 154(b) by 147 days.

(21) Appl. No.: 13/069,594

(22) Filed: Mar. 23, 2011

(65) Prior Publication Data
US 2012/0103393 A1 May 3, 2012

(30) Foreign Application Priority Data

Nov. 3, 2010 (TW) .............................. 99137795 A

(51) Int. Cl.
*H01L 31/052* (2006.01)
(52) U.S. Cl. .................................. 250/203.4; 356/141.5
(58) Field of Classification Search ............... 250/203.3, 250/203.4, 214.1, 214 R; 356/141.5, 139.01–139.03
See application file for complete search history.

(56) References Cited

U.S. PATENT DOCUMENTS

| | | | |
|---|---|---|---|
| 6,396,047 B1 * | 5/2002 | Sumiya et al. ............. | 250/214 R |
| 7,962,265 B2 * | 6/2011 | Pinney ............................. | 701/49 |
| 2009/0138140 A1 * | 5/2009 | Pinney ............................. | 701/3 |

* cited by examiner

*Primary Examiner* — Seung C Sohn
(74) *Attorney, Agent, or Firm* — WPAT, P.C.; Anthony King

(57) ABSTRACT

This invention discloses a solar sensing system and a solar tracking method thereof. The solar sensing system comprises a solar module, an azimuth sensor unit, an elevation sensor unit and a driving unit. The azimuth sensor unit and the elevation sensor unit are disposed on the surface of the solar module. The azimuth sensor unit senses sunlight to generate an azimuth signal. The driving unit receives the azimuth signal to turn the solar module until the azimuth sensor unit is aligned precisely towards the sunlight. The elevation sensor unit senses the sunlight to generate an elevation signal. The driving unit receives the elevation signal to turn the solar module until the elevation sensor unit is aligned precisely towards the sunlight. If the azimuth sensor unit and the elevation sensor unit are aligned precisely towards the sunlight, the solar module will also be aligned precisely towards the sunlight.

9 Claims, 7 Drawing Sheets

SOLAR SENSING SYSTEM AND SOLAR TRACKING METHOD THEREOF

BACKGROUND OF THE INVENTION

1. Field of the Invention

The present invention relates to a solar sensing system and a solar tracking method thereof, and more particularly to a solar sensing system and a solar tracking method thereof that tracks and positions sunlight respectively by an azimuth and an elevation.

2. Description of the Related Art

At present, solar technology is a technology of renewable energy with a high potential of development. Solar panels are used for absorbing sunlight and converting the sunlight into electric energy for generating and supplying electric power to household electric appliances, and solar cars are driven by solar energy. Solar energy is used extensively in different areas including solar cells and various solar appliances, and thus many technologies related to the effective conversion from sunlight into electric energy were developed.

In the market, there are different types of photosensing elements including photoconductors, light emitting diodes, photo transistors, solar cells, etc. Each type of sensing elements having advantages and disadvantage is selected according to the user's requirements for a solar system. However, it is very important for the solar system to track the position of sunlight for collecting the sunlight effectively, in addition to the light sensing properties of the photosensing element. Even though an excellent photosensing element is adopted, the sunlight cannot be utilized effectively when the solar system is unable to locate the sunlight. Therefore a solar tracking sensor is developed to track the sunlight.

The way of using the solar tracking sensor to track sunlight to improve the light collection of the solar panel is a prior art. Most conventional solar tracking sensors tracks the sunlight based on the X-Y coordinates that are applied to two axes of the solar panel, and two angles including the x-axis included angle and the Y-axis included angle will be coupled. In other words, if the X-axis is used for performing an East-West direction tracking and the tracking is completed, and then the Y-axis is used for performing a South-North direction tracking, that will destroy the originally positioned X-axis angle, and vice versa. The coupling phenomenon of the two axes will consume much time and power for the tracking process and result in a low efficiency. It is an important subject for related designers and manufacturers to develop a solar tracking sensor without the aforementioned coupling phenomenon and capable of tracking sunlight effectively.

SUMMARY OF THE INVENTION

In view of the aforementioned problems of the prior art, it is a primary objective of the present invention to provide a solar sensing system and a solar tracking method of the solar sensing system to overcome the coupling problem caused by a sensor using the X-Y axes to track sunlight.

To achieve the foregoing objective, the present invention provides a solar sensing system, comprising a solar module, an azimuth sensor unit, an elevation sensor unit and a driving unit. The azimuth sensor unit is installed onto a surface of solar module for sensing sunlight to generate an azimuth signal. The elevation sensor unit is installed on the same surface of the solar module where the azimuth sensor unit is located for sensing sunlight to generate an elevation signal. The driving unit is coupled to the solar module, such that if the driving unit receives the azimuth signal and the elevation signal, the solar module will be turned until the solar module is aligned precisely towards the sunlight.

In the solar sensing system of the present invention, the azimuth sensor unit comprises a first substrate, a first sensing element, a second sensing element and a first partition. The first substrate is formed on a surface of the solar module. The first sensing element is installed on a surface of the first substrate for sensing sunlight and converting the sunlight into a first potential. The second sensing element is installed on the same surface of the first substrate where the first sensing element is located for sensing sunlight and converting the sunlight into a second potential. The first partition is installed on the same surface of the first substrate where the first sensing element and the second sensing element are located for separating the first sensing element and the second sensing element, such that the first sensing element and the second sensing element are installed on a side and the other opposite side of the first partition, respectively. If the solar module is not aligned precisely towards the sunlight, the sunlight will be projected onto the first partition to produce a shadow and the shadow will cover the first sensing element or the second sensing element, so that the first potential and the second potential will produce a first potential difference, which is the azimuth signal. The driving unit receives the first potential difference to turn the solar module until the azimuth sensor unit is aligned precisely towards the sunlight and the value of the first potential difference is zero.

The first potential and second potential have potential strengths directly proportional to the intensities of sunlight sensed by the first sensing element and the second sensing element respectively. If the first potential and the second potential have different potential strengths, the so-called first potential difference is produced. If the first potential and the second potential have the same potential strength, the value of the first potential difference will be zero and the azimuth sensor unit will be aligned precisely towards the sunlight.

In the solar sensing system of the present invention, the elevation sensor unit includes a second substrate, a third sensing element, a fourth sensing element and a second partition. The second substrate is installed on a surface of the solar module. The third sensing element is installed on a surface of the second substrate and provided for sensing sunlight and converting the sunlight into a third potential. The fourth sensing element is installed on the same surface of the second substrate where the third sensing element is located and provided for sensing sunlight and converting the sunlight into a fourth potential. The second partition is installed on the same surface of the second substrate where the third sensing element and the fourth sensing element are located and provided for separating the third sensing element and the fourth sensing element, such that the third sensing element and the fourth sensing element are installed on a side and the other opposite side of the second partition respectively. If the solar module is not aligned precisely towards the sunlight, the sunlight will be projected onto the second partition to produce a shadow, and the shadow will cover the third sensing element or the fourth sensing element, such that the third potential and the fourth potential produce a second potential difference which is an elevation signal. The driving unit receives the second potential difference to turn the solar module until the elevation sensor unit is aligned precisely towards the sunlight and the second potential difference has a value of zero.

The potential strengths of the third potential and the fourth potential are proportional to the intensities of sunlight sensed by the third sensing element and the fourth sensing element respectively. If the third potential and the fourth potential have different potential strengths, the so-called second potential difference is produced. If the third potential and the fourth potential have the same potential strength, the second potential difference will have a value of zero, and the elevation sensor unit will be aligned precisely towards the sunlight.

To achieve the objective of the present invention, the invention further provides a solar tracking method applicable to a solar sensing system. Firstly, an azimuth sensor unit is provided for sensing sunlight and generating an azimuth signal. Secondly, a driving unit is provided for receiving the azimuth signal to turn a solar module until the azimuth sensor unit is aligned precisely towards the sunlight. Finally, an elevation sensor unit is provided for sensing the sunlight and generating an elevation signal, and then a driving unit is used for receiving the elevation signal to turn the solar module until the elevation sensor unit is aligned precisely towards the sunlight. Now, the solar module will be aligned precisely towards the sunlight.

To achieve the objective of the present invention, the invention further provides a solar tracking method applicable to a solar sensing system. Firstly, an elevation sensor unit is provided for sensing sunlight and generating an elevation signal. Secondly, a driving unit is provided for receiving the elevation signal to turn a solar module until the elevation sensor unit is aligned precisely towards the sunlight. Finally, an azimuth sensor unit is provided for sensing the sunlight and generating an azimuth signal, and then a driving unit is used for receiving the azimuth signal to turn the solar module until the azimuth sensor unit is aligned precisely towards the sunlight. Now, the solar module will be aligned precisely towards the sunlight.

In the foregoing solar tracking method of the present invention, the azimuth sensor unit includes a first substrate, a first sensing element, a second sensing element and a first partition. The first sensing element, second sensing element and first partition are installed on a surface of the first substrate, and the first partition separates the first sensing element and the second sensing element such that the first sensing element and the second sensing element are disposed on a side and the other opposite side of the first partition respectively. If the solar panel is not aligned precisely towards the sunlight, the azimuth sensor unit will sense the sunlight by the following method. Firstly, a shadow is formed by the first partition to cover the first sensing element or the second sensing element. The first sensing element and the second sensing element are provided for sensing sunlight, and converting the sunlight into a first potential and a second potential respectively, wherein the first potential and the second potential produce a first potential difference, which is the azimuth signal. Now, the driving unit receives the first potential difference to turn the solar module until the azimuth sensor unit is aligned precisely towards the sunlight and the first potential difference has a value of zero.

The first potential and the second potential have potential strengths proportional to the intensities of sunlight sensed by the first sensing element and the second sensing element respectively. If the first potential and the second potential have different potential strengths, the so-called first potential difference will be produced. If the first potential and the second potential have different potential strengths, the first potential difference will have a value of zero, and the azimuth sensor unit will be aligned precisely towards the sunlight.

In the foregoing solar tracking method of the present invention, the elevation sensor unit includes a second substrate, a third sensing element, a fourth sensing element and a second partition. The third sensing element, fourth sensing element and second partition are installed on a surface of the second substrate, and the second partition separates the third sensing element and the fourth sensing element, such that the third sensing element and the fourth sensing element are disposed on a side and the other opposite side of the second partition respectively. If the solar panel is not aligned precisely towards the sunlight, the elevation sensor unit will sense the sunlight by the following method. Firstly, the second partition produces a shadow to cover the third sensing element or the fourth sensing element. Secondly, the third sensing element and the fourth sensing element are provided for sensing sunlight, and converting the sunlight into a third potential and a fourth potential respectively, and the third potential and fourth potential produce a second potential difference which is the elevation signal. Now, the driving unit is used for receiving the second potential difference to turn the solar module until the elevation sensor unit is aligned precisely towards the sunlight, and the second potential difference has a value of zero.

The third potential and the fourth potential have potential strengths directly proportional to the intensities of sunlight sensed by the third sensing element and the fourth sensing element respectively. If the third potential and the fourth potential have different potential strengths, the so-called second potential difference will be produced. If the third potential and the fourth potential have the same potential strength, the second potential difference has a value of zero, and the elevation sensor unit is aligned precisely towards the sunlight.

In summation, the solar sensing system and its solar tracking method in accordance with the present invention have one or more of the following advantages:

(1) In the solar sensing system and its solar tracking method of the invention, the tracking method adopts a two-axis coordinate (azimuth-elevation) system to position and track sunlight. After the azimuth is tracked and positioned, the elevation is adjusted, or after the elevation is tracked and positioned, the azimuth is adjusted. Therefore, the two angles will not be coupled completely so as to achieve the decoupling function and overcome the time and energy consuming issues of the coupling phenomenon and improve the overall efficiency.

(2) In the solar sensing system and its solar tracking method of the invention, the partition of the azimuth sensor unit and the elevation sensor unit are provided for separating the sensing elements installed on both sides of the partition. Thus, when sunlight is projected slantingly, the sensing elements on both sides of the partition will not sense the same sunlight, and the solar sensing system can sense the position of the sunlight more accurately to improve the light tracking sensitivity substantially.

(3) In the solar sensing system and its solar tracking method of the invention, the azimuth sensor unit and the elevation sensor unit generally come with simple components and a structure composed of a substrate, a partition, and two sensing elements, so that the manufacturing cost can be lowered effectively.

DETAILED DESCRIPTION OF THE PREFERRED EMBODIMENTS

Figure 1:
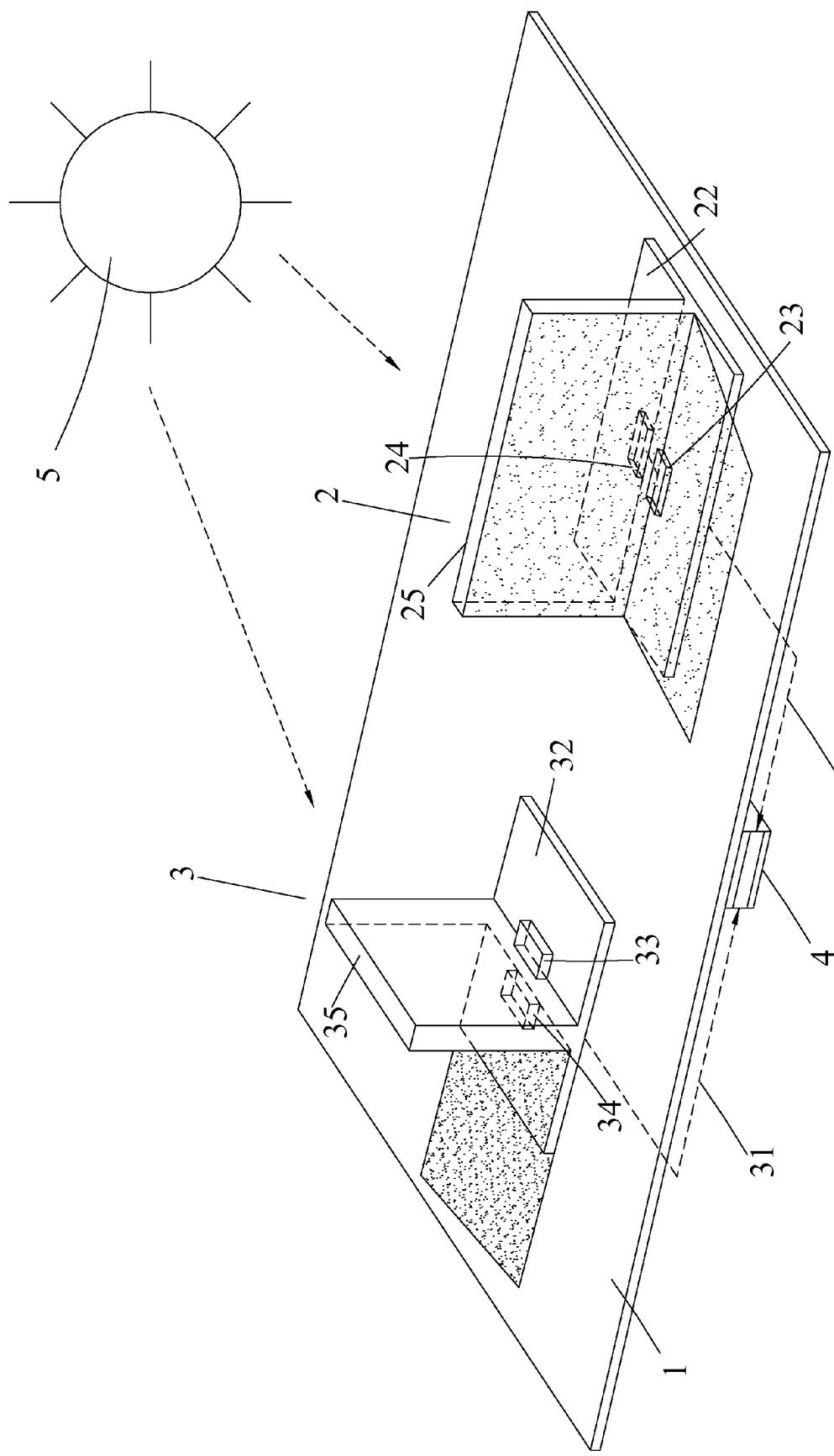
FIG. 1 is a schematic view of a solar sensing system of the present invention.

With reference to FIG. 1 for a schematic view of a solar sensing system of the present invention, a solar module 1 includes an azimuth sensor unit 2 and an elevation sensor unit 3 installed on a surface of the solar module 1. The driving unit 4 is coupled to the solar module 1, azimuth sensor unit 2 and elevation sensor unit 3. If the solar module 1 is not aligned precisely towards sunlight 5, the azimuth sensor unit 2 will sense the sunlight 5 and generates an azimuth signal 21 to be transmitted to the driving unit 4, and the elevation sensor unit 3 will also sense the sunlight 5 to generate an elevation signal 31 to be transmitted to the driving unit 4. The driving unit 4 will start moving the solar module 1 horizontally sideway according to the azimuth signal 21. After the azimuth sensor unit 2 is aligned precisely towards the sunlight 5, the driving unit 4 starts moving the solar module 1 vertically up and down according to the elevation signal 31. After the elevation sensor unit 3 is aligned precisely towards the sunlight 5, the solar module 1 stops turning. Now, the solar module 1 is aligned precisely towards the sunlight 5.

The azimuth sensor unit 2 includes a first substrate 22, a first sensing element 23, a second sensing element 24 and a first partition 25, wherein the first substrate 22 is installed onto the solar module 1. The elevation sensor unit 3 includes a second substrate 32, a third sensing element 33, a fourth sensing element 34 and a second partition 35, wherein the second substrate 32 is installed on the solar module 1. The principles for the azimuth sensor unit 2 and the elevation sensor unit 3 to sense the sunlight 5 are illustrated in FIGS. 2 and 3, respectively.

Figure 2:
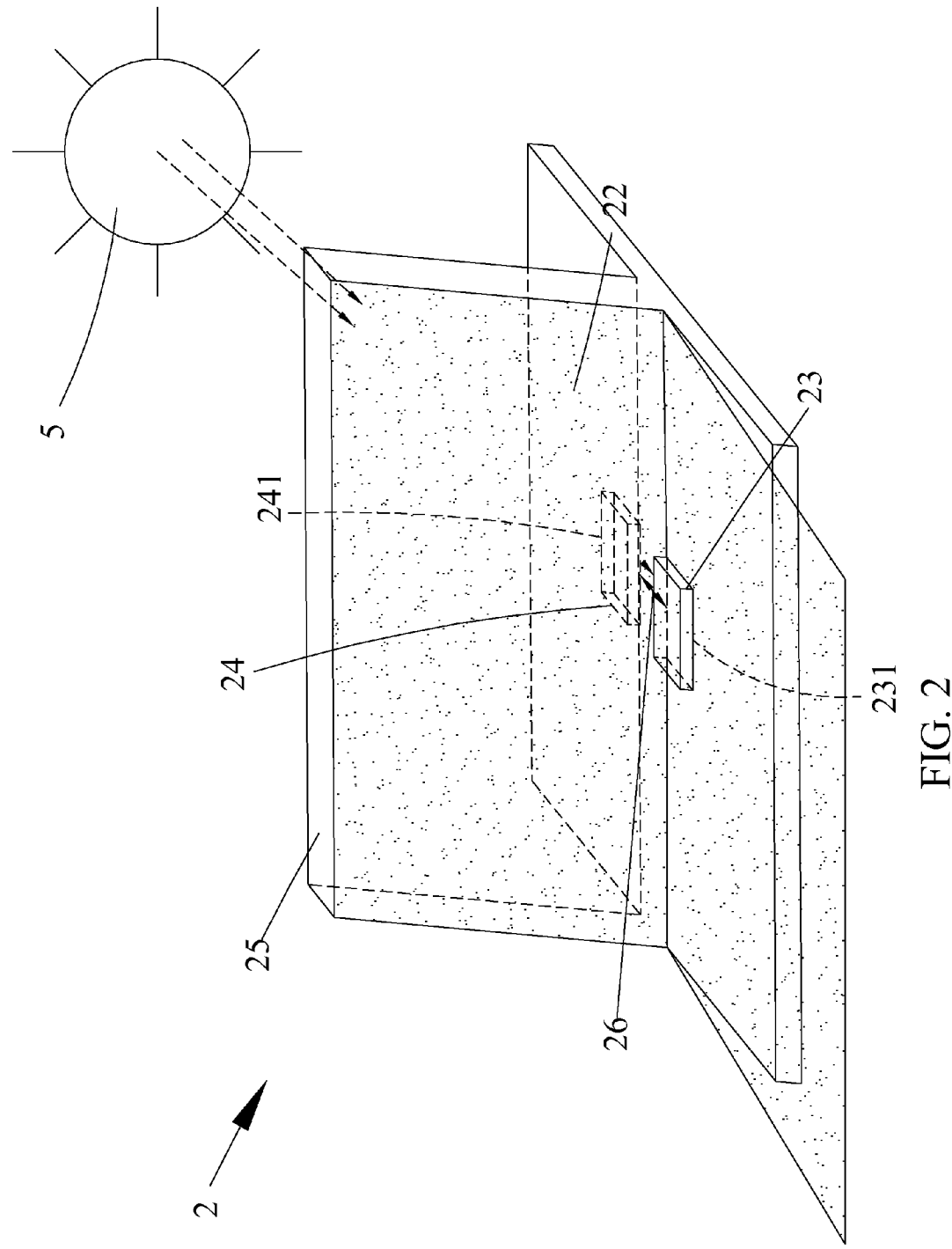
FIG. 2 is a schematic view of an azimuth sensor unit of a solar sensing system of the present invention.

With reference to FIG. 2 for a schematic view of an azimuth sensor unit of a solar sensing system of the present invention, the first sensing element 23, second sensing element 24 and first partition 25 are installed on a surface of the first substrate 22. The first partition 25 is mainly used for separating the first sensing element 23 and the second sensing element 24, such that the first sensing element 23 and the second sensing element 24 are disposed on a side and the other opposite side of the first partition 25 respectively. The first sensing element 23 and the second sensing element 24 are provided for sensing the sunlight 5 and converting the sunlight 5 into a first potential 231 and a second potential 241, respectively. The greater the intensities of sunlight 5 sensed by the first sensing element 23 and second sensing element 24, the greater are the potential strengths of the first potential 231 and second potential 241, respectively. If the sunlight 5 is projected slantingly, the sunlight 5 will be projected onto the first partition 25 to produce a shadow to cover the first sensing element 23. Now, the first potential 231 has a potential strength less than the potential strength of the second potential 241, and thus a first potential difference 26 is produced, and the first potential difference 26 is the azimuth signal 21 as shown in FIG. 1. When the driving unit 4 receives the first potential difference 26, the solar module 1 starts turning until the azimuth sensor unit 2 is aligned precisely towards the sunlight 5. Now, the intensities of sunlight 5 sensed by the first sensing element 23 and the second sensing element 24 are the same, and the potential strength of the first potential 231 is equal to the potential strength of the second potential 241, such that the first potential difference 26 will become zero.

Figure 3:
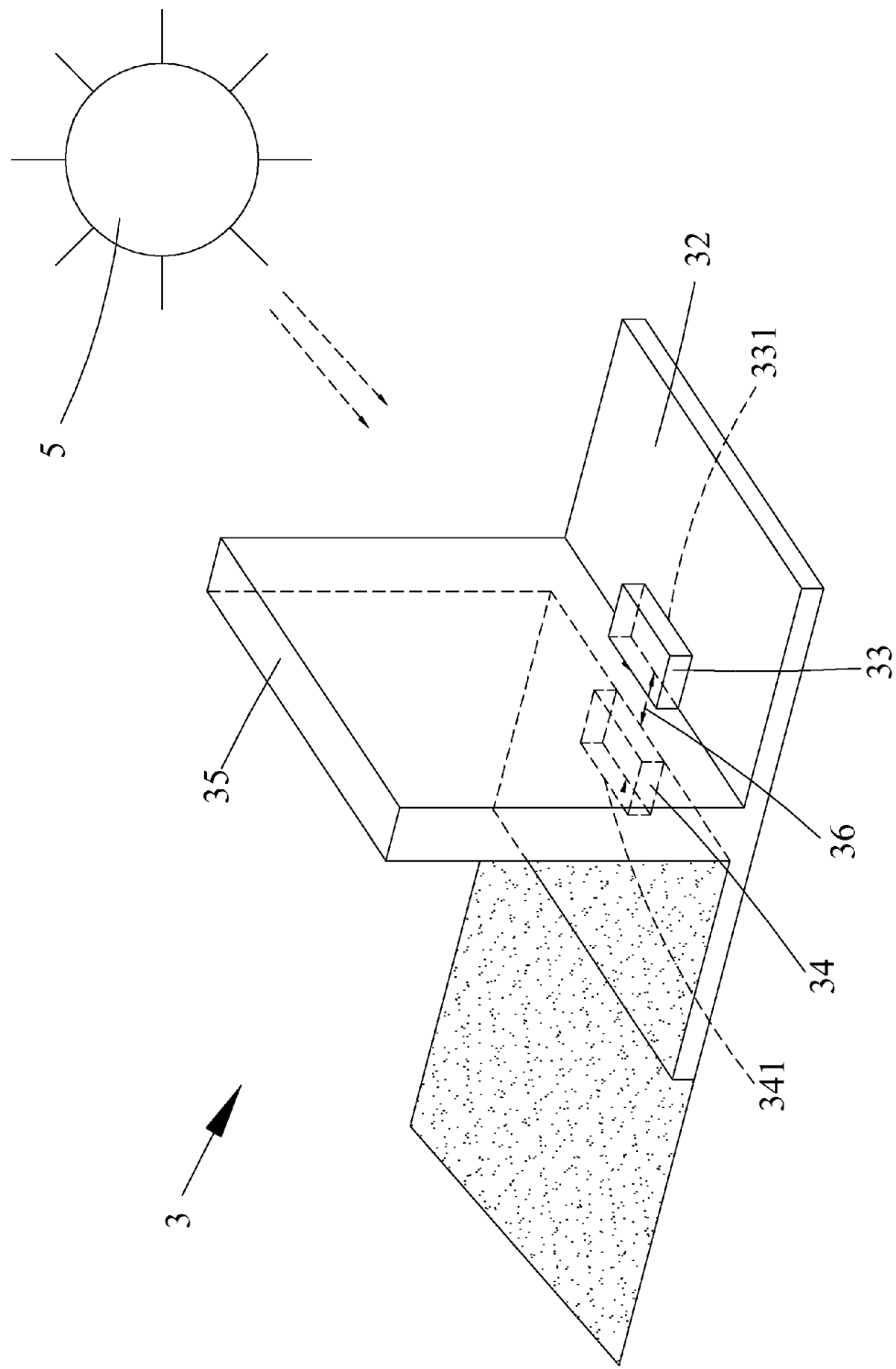
FIG. 3 is a schematic view of an elevation sensor unit of a solar sensing system of the present invention.

With reference to FIG. 3 for a schematic view of an elevation sensor unit of a solar sensing system of the present invention, the third sensing element 33, fourth sensing element 34 and first partition 35 are installed on a surface of the second substrate 32. The second partition 35 is mainly used for separating the third sensing element 33 and the fourth sensing element 34, such that the third sensing element 33 and the fourth sensing element 34 are disposed on a side and the other opposite side of the first partition 35 respectively. The third sensing element 33 and the fourth sensing element 34 are used for sensing sunlight 5 and converting the sunlight 5 into a third potential 331 and a fourth potential 341, respectively. The greater the intensities of sunlight sensed by the third sensing element 33 and the fourth sensing element 34, the greater are the potential strengths of the third potential 331 and the fourth potential 341. If the elevation sensor unit 3 is not aligned precisely towards the sunlight 5, the sunlight 5 will be projected onto the second partition 35 to form a shadow to cover the fourth sensing element 34. Now, the fourth potential 341 has a potential strength less than the potential strength of the third potential 331, such that a second potential difference 36 is produced, and the second potential difference 36 is the elevation signal 31 as shown in FIG. 1. If the driving unit 4 receives the second potential difference 36, the solar module 1 will start turning until the elevation sensor unit 3 is aligned precisely towards the sunlight 5. The intensities of sunlight 5 sensed by the fourth sensing element 34 and the third sensing element 33 are equal, and the potential strength of the fourth potential 341 is equal to the potential strength of the third potential 3311, and the second potential difference 36 has a value of zero.

Figure 4:
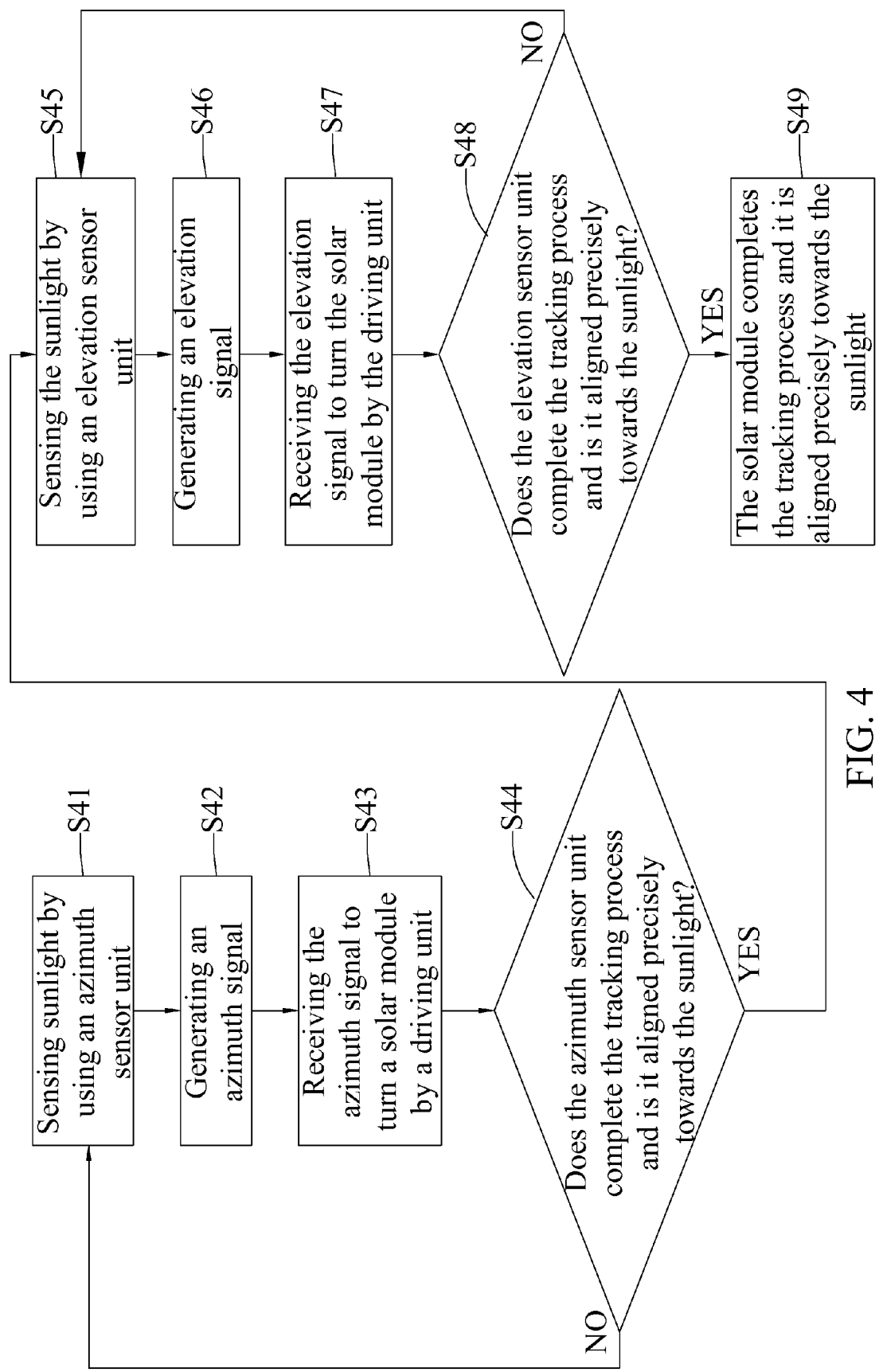
FIG. 4 is a flow chart of a solar tracking method in accordance with a first preferred embodiment of the present invention.

With reference to FIG. 4 for a flow chart of a solar tracking method in accordance with a first preferred embodiment of the present invention, this preferred embodiment uses an azimuth sensor unit to track and position the azimuth of the sunlight, and then an elevation sensor unit to track and position the elevation of the sunlight. The solar tracking method comprises the following steps. S41: Sunlight is sensed by using an azimuth sensor unit. S42: An azimuth signal is generated after the azimuth sensor unit senses the sunlight. S43: the azimuth signal is received to turn a solar module sideway by a driving unit. S44: Whether the azimuth sensor unit is aligned precisely towards the sunlight or not is determined after the solar module is turned; if no, go to Step S41 to continue tracking the azimuth of the sunlight; and if yes, go to Step S45. S45: The sunlight is sensed by using an elevation sensor unit. S46: An elevation signal is generated after the elevation sensor unit senses the sunlight. S47: The elevation signal is received to turn the solar module up and down by the driving unit. S48: Whether the elevation sensor unit is aligned precisely towards the sunlight or not is determined after the solar module is turned; if no, go to Step S45 to continue tracking the elevation of the sunlight; and if yes, go to Step S49. S49: Finally, the solar module stops turning. Now, the solar module completes the tracking and positioning processes and it is aligned precisely towards the sunlight.

Figure 5:
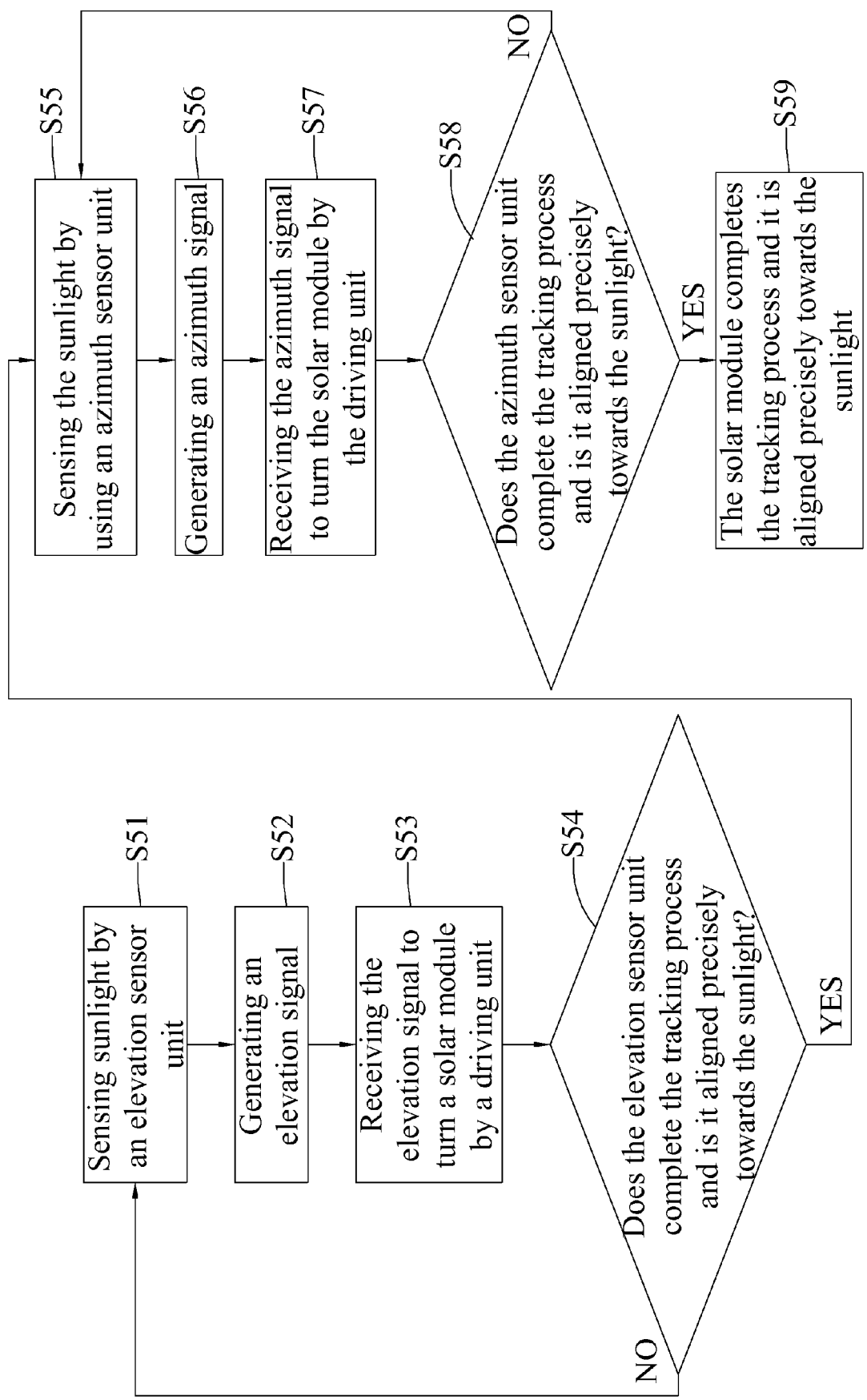
FIG. 5 is a flow chart of a solar tracking method in accordance with a second preferred embodiment of the present invention.

With reference to FIG. 5 for a flow chart of a solar tracking method in accordance with a second preferred embodiment of the present invention, this preferred embodiment uses an elevation sensor unit to track and position the elevation of sunlight, and then uses an azimuth sensor unit to track and position the azimuth of the sunlight. The solar tracking method comprises the following steps. S51: Sunlight is sensed by an elevation sensor unit. S52: An elevation signal is generated after the elevation sensor unit senses the sunlight. S53: The elevation signal is received to turn the solar module up and down by the driving unit. S54: Whether the elevation sensor unit is aligned precisely towards the sunlight or not is determined after the solar module is turned; if no, go to Step S51 to continue tracking the elevation of the sunlight; and if yes, go to Step S55. S55: The sunlight is sensed by using an azimuth sensor unit. S56: An azimuth signal is generated after the azimuth sensor unit senses the sunlight. S57: The azimuth signal is received to turn the solar module sideway by the driving unit. S58: Whether the azimuth sensor unit is aligned precisely towards the sunlight or not is determined after the solar module is turned; if no, then go to Step S55 to continue tracking the azimuth of the sunlight; and if yes, go to Step S59. S59: Finally, the solar module stops turning. Now, the solar module completes the tracking and positioning processes, and it is aligned precisely towards the sunlight.

Figure 6:
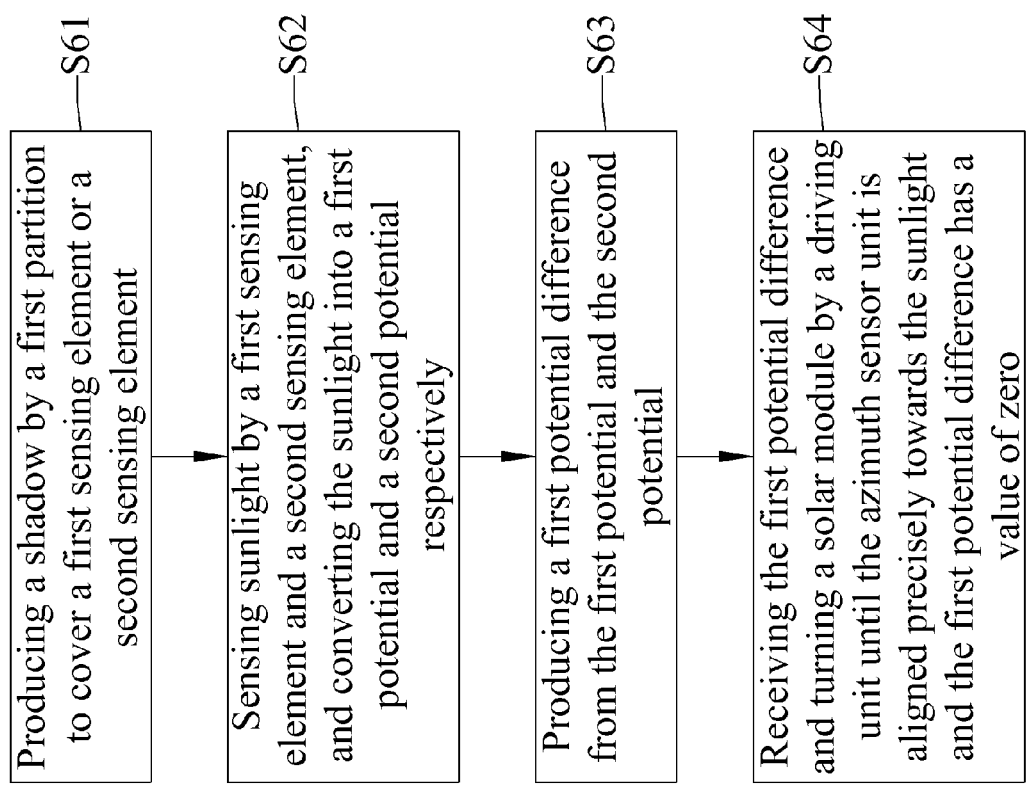
FIG. 6 is a flow chart of a solar tracking method in accordance with a third preferred embodiment of the present invention.

With reference to FIG. 6 for a flow chart of a solar tracking method in accordance with a third preferred embodiment of the present invention, this preferred embodiment adopts the method of the first preferred embodiment and the second preferred embodiment of sensing the sunlight by the azimuth sensor unit. The azimuth sensor unit has a structure as shown in FIG. 2, and the procedure for the azimuth sensor unit to sense the sunlight comprises the following steps. S61: A shadow is produced by a first partition to cover a first sensing element or a second sensing element. S62: Sunlight is sensed by a first sensing element and a second sensing element, and the sunlight is converted into a first potential and a second potential, respectively. S63: A first potential difference is produced from the first potential and the second potential. S64: A solar module is turned until the azimuth sensor unit is aligned precisely towards the sunlight, and the first potential difference has a value of zero after the driving unit receives the first potential difference.

Figure 7:
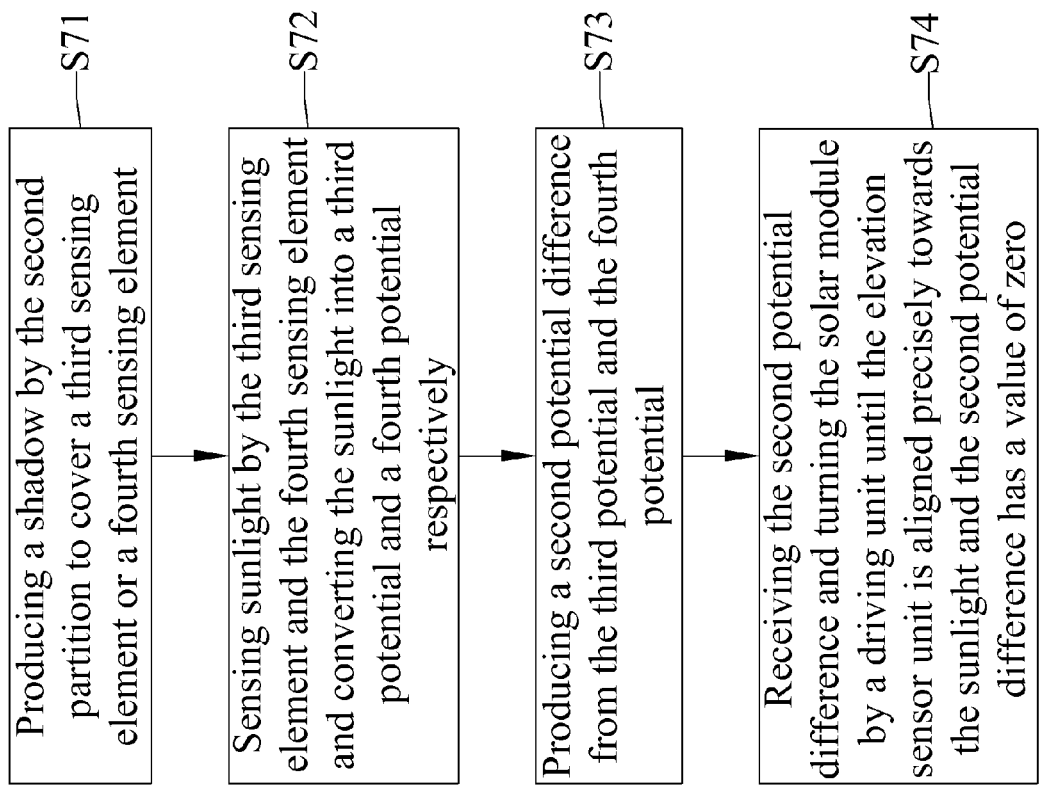
FIG. 7 is a flow chart of a solar tracking method in accordance with a fourth preferred embodiment of the present invention.

With reference to FIG. 7 for a flow chart of a solar tracking method in accordance with a fourth preferred embodiment of the present invention, this preferred embodiment adopts the method of the first preferred embodiment and the second preferred embodiment of sensing the sunlight by the elevation sensor unit. The elevation sensor unit has a structure as shown in FIG. 3, and the procedure for the elevation sensor unit to sense the sunlight comprises the following steps. S71: A shadow is produced by the second partition to cover a third sensing element or a fourth sensing element. S72: Sunlight is sensed by the third sensing element and the fourth sensing element and the sunlight is converted into a third potential and a fourth potential respectively. S73: A second potential difference is produced from the third potential and the fourth potential. S74: The second potential difference is received, and the solar module is turned by a driving unit until the elevation sensor unit is aligned precisely towards the sunlight, and the second potential difference has a value of zero.

In summation of the description above, the solar sensing system and its solar tracking method of the present invention mainly uses the azimuth sensor unit and the elevation sensor unit to track the azimuth and the elevation of the sunlight respectively. The tracking of the azimuth of the sunlight is performed first, and then the tracking of the elevation of the sunlight is performed, or vice versa. Thus, the solar sensing system will not have a coupling phenomenon, and the overall efficiency of sensing the sunlight can be improved. In addition, the azimuth sensor unit and the elevation sensor unit of the solar sensing system of the present invention come with a simple structure, so that the cost can be saved, and the sensitivity of sensing the sunlight can be enhanced.

What is claimed is:

1. A solar sensing system, comprising:
   a solar module;
   an azimuth sensor unit installed on a surface of the solar module for sensing sunlight to generate an azimuth signal, and the azimuth sensor unit further comprising:
      a first substrate disposed on the surface of the solar module;
      a first sensing element installed on a surface of the first substrate for sensing the sunlight and converting the sunlight into a first potential;
      a second sensing element installed on the same surface of the first substrate where the first sensing element is located for sensing the sunlight and converting the sunlight into a second potential; and
      a first partition installed on the same surface of the first substrate where the first sensing element and the second sensing element are located, and the first sensing element and the second sensing element being installed on a side and the other opposite side of the first partition respectively, and the first partition being provided for separating the first sensing element and the second sensing element, such that when the solar module is not aligned precisely towards the sunlight, the sunlight is projected onto the first partition to produce a shadow to cover the first sensing element or the second sensing element, so that the first potential and the second potential produce a first potential difference, and the first potential difference is the azimuth signal;
   an elevation sensor unit installed on the same surface of the solar module where the azimuth sensor unit is located for sensing the sunlight to generate an elevation signal, and the elevation sensor unit further comprising:
      a second substrate installed on the same surface of the solar module where the first substrate is located;
      a third sensing element installed on a surface of the second substrate for sensing the sunlight and converting the sunlight into a third potential;
      a fourth sensing element installed on the same surface of the second substrate where the third sensing element is located for sensing the sunlight and converting the sunlight into a fourth potential; and
      a second partition installed on the same surface of the second substrate where the third sensing element and the fourth sensing element are located, and the third sensing element and the fourth sensing element being installed on a side and the other opposite side of the second partition respectively, and the second partition being provided for separating the third sensing element and the fourth sensing element, such that when the solar module is not aligned precisely towards the sunlight, the sunlight is projected onto the second partition to produce a shadow to cover the third sensing element or the fourth sensing element, so that the third potential and the fourth potential produces a second potential difference, and the second potential difference is the elevation signal; and
   a driving unit coupled to the solar module for receiving the azimuth signal to turn the solar module until the azimuth sensor unit is aligned precisely towards the sunlight and the first potential difference has a value of zero, and receiving the elevation signal to turn the solar module until the elevation sensor unit is aligned precisely towards the sunlight, and the second potential difference has a value of zero, such that the solar module is aligned precisely towards the sunlight.

2. The solar sensing system of claim 1, wherein the first potential and the second potential respectively have potential strengths directly proportional to intensities of the sunlight sensed by the first sensing element and the second sensing element, and if the first potential and the second potential have different potential strengths, then the first potential difference is produced, and if the first potential and the second potential have the same potential strength, then the first potential difference has a value of zero such that the azimuth sensor unit is aligned precisely towards the sunlight.

3. The solar sensing system of claim 1, wherein the third potential and the fourth potential respectively have potential strengths directly proportional to intensities of the sunlight sensed by the third sensing element and the fourth sensing element, and if the third potential and the fourth potential have different potential strengths, then the second potential difference is produced, and if the third potential and the fourth potential have the same potential strength, the second potential difference has a value of zero such that the elevation sensor unit is aligned precisely towards the sunlight.

4. A solar tracking method, applicable to the solar sensing system of claim 1, and the solar tracking method comprising the steps of:
projecting the sunlight onto the first partition to form the shadow to cover the first sensing element or the second sensing element;
using the first sensing element and the second sensing element to sense the sunlight, and converting the sunlight into the first potential and the second potential respectively;
using the first potential and the second potential to produce the first potential difference, which is the azimuth signal;
receiving the azimuth signal by the driving unit;
turning the solar module by the driving unit until the azimuth sensor unit is aligned precisely towards the sunlight and the first potential difference has a value of zero;
projecting the sunlight onto the second partition to form the shadow to cover the third sensing element or the fourth sensing element;
using the third sensing element and the fourth sensing element to sense the sunlight, and converting the sunlight into the third potential and the fourth potential respectively;
using the third potential and the fourth potential to produce the second potential difference, which is the elevation signal;
receiving the elevation signal by the driving unit; and
turning the solar module by the driving unit until the elevation sensor unit is aligned precisely towards the sunlight and the second potential difference has a value of zero, and the solar module being aligned precisely towards the sunlight.

5. The solar tracking method of claim 4, wherein the first potential and the second potential have potential strengths directly proportional to intensities of the sunlight sensed by the first sensing element and the second sensing element respectively, and if the first potential and the second potential have different potential strengths, the first potential difference is produced, and if the first potential and the second potential have potential strengths, the first potential difference has a value equal to zero, such that the azimuth sensor unit is aligned precisely towards the sunlight.

6. The solar tracking method of claim 4, wherein the third potential and the fourth potential have potential strengths directly proportional to intensities of the sunlight sensed by the third sensing element and the fourth sensing element respectively, and if the third potential and the fourth potential have different potential strengths, the second potential difference is produced, and if the third potential and the fourth potential have the same potential strength, the second potential difference has a value equal to zero, such that the elevation sensor unit is aligned precisely towards the sunlight.

7. A solar tracking method, applicable to the solar sensing system of claim 1, and the solar tracking method comprising the steps of:
projecting the sunlight onto the second partition to form the shadow to cover the third sensing element or the fourth sensing element;
using the third sensing element and the fourth sensing element to sense the sunlight, and converting the sunlight into the third potential and the fourth potential respectively;
using the third potential and the fourth potential to produce the second potential difference, which is the elevation signal;
receiving the elevation signal by the driving unit;
turning the solar module by the driving unit until the elevation sensor unit is aligned precisely towards the sunlight and the second potential difference has a value of zero;
projecting the sunlight onto the first partition to form the shadow to cover the first sensing element or the second sensing element;
using the first sensing element and the second sensing element to sense the sunlight, and converting the sunlight into the first potential and the second potential respectively;
using the first potential and the second potential to produce the first potential difference, which is the azimuth signal;
receiving the azimuth signal by the driving unit; and
turning the solar module by the driving unit until the azimuth sensor unit is aligned precisely towards the sunlight and the first potential difference has a value of zero, and the solar module being aligned precisely towards the sunlight.

8. The solar tracking method of claim 7, wherein the first potential and the second potential have potential strengths directly proportional to intensities of the sunlight sensed by the first sensing element and the second sensing element respectively, and if the first potential and the second potential have different potential strengths, the first potential difference is produced, and if the first potential and the second potential have potential strengths, the first potential difference has a value equal to zero, such that the azimuth sensor unit is aligned precisely towards the sunlight.

9. The solar tracking method of claim 7, wherein the third potential and the fourth potential have potential strengths directly proportional to intensities of the sunlight sensed by the third sensing element and the fourth sensing element respectively, and if the third potential and the fourth potential have different potential strengths, the second potential difference is produced, and if the third potential and the fourth potential have the same potential strength, the second potential difference has a value equal to zero, such that the elevation sensor unit is aligned precisely towards the sunlight.

* * * * *